United States Patent [19]

Wheeler et al.

[11] Patent Number: 4,824,243

[45] Date of Patent: Apr. 25, 1989

[54] COMPACT CONTINUOUS WAVE WAVEFRONT SENSOR

[75] Inventors: Bryce A. Wheeler, Los Angeles; Lacy G. Cook, El Segundo, both of Calif.

[73] Assignee: Hughes Aircraft Company, Los Angeles, Calif.

[21] Appl. No.: 53,901

[22] Filed: May 26, 1987

[51] Int. Cl.$^4$ ............................................. G01J 1/20
[52] U.S. Cl. .................................... 356/121; 250/201
[58] Field of Search ......................... 356/121; 250/201

[56] References Cited

U.S. PATENT DOCUMENTS 4,405,232  9/1983  Mansell .............................. 356/121

Primary Examiner—F. L. Evans
Attorney, Agent, or Firm—William J. Streeter; A. W. Karambelas

[57] ABSTRACT

A wavefront sensor (10) for use in determining a phase error of an input beam (16) is disclosed. The wavefront sensor (10) includes mechanisms for obtaining a sample of an input beam (16). A mechanism (18) for splitting the beam (16) into two component beams (46) and (48) is associated with the beam (16). A second mechanism (20) for splitting the two component beams (46) and (48) into four component beams (58), (60), (62) and (64) is associated with the first splitting mechanism (18). A mechanism (26) for detecting the intensity distribution of the four component beams (58), (60), (62) and (64) is associated with the second splitting mechanism (20). A mechanism for determining the phase error of the input beam (16) from the intensity distributions is associated with the detector mechanism (26). Also disclosed is a method for determining the phase error on an input beam (16) using the above described wavefront sensor (10).

16 Claims, 1 Drawing Sheet

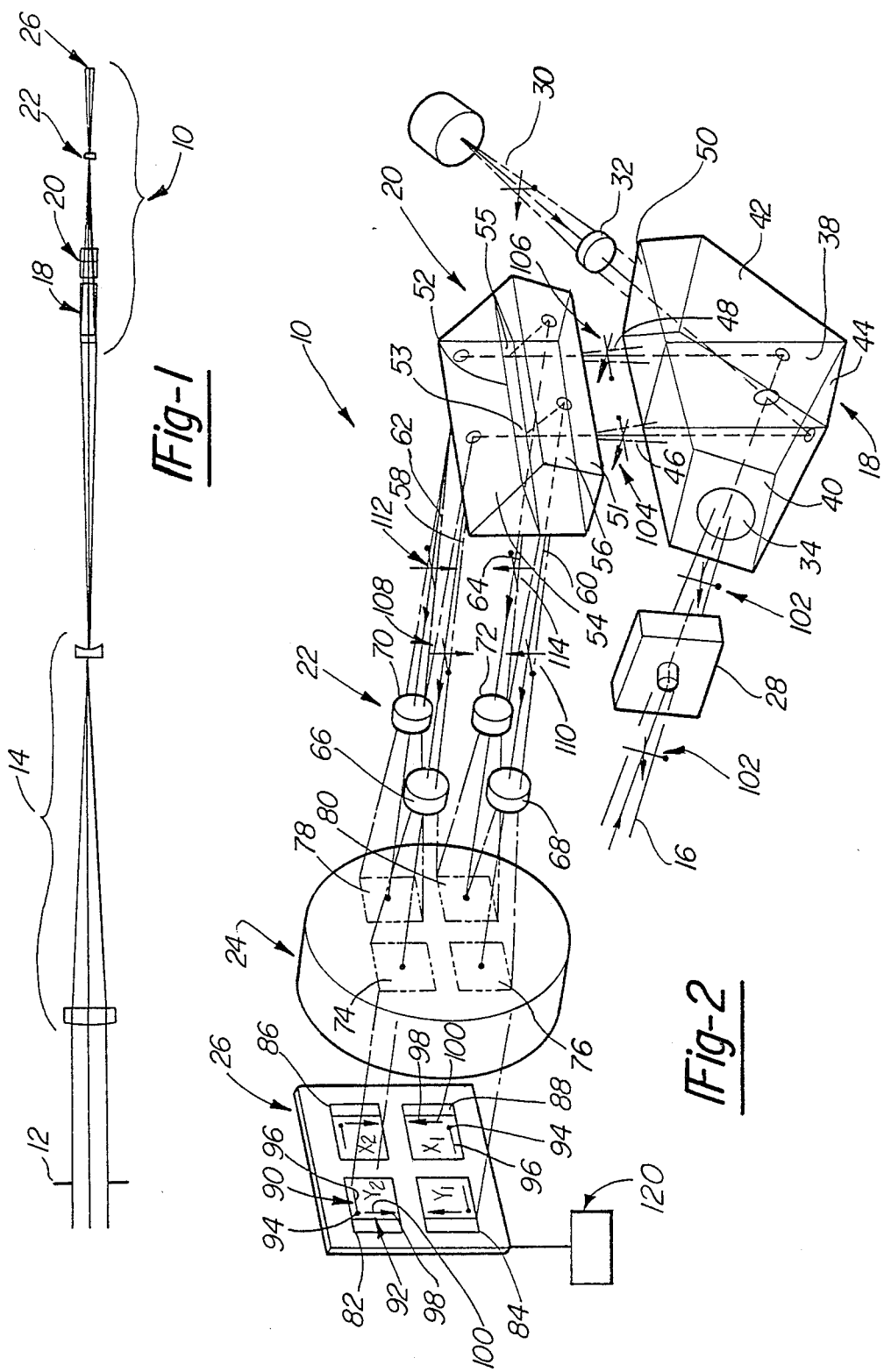

COMPACT CONTINUOUS WAVE WAVEFRONT SENSOR

BACKGROUND OF THE INVENTION

1. Field of the Invention

The present invention relates to devices for determining optical aberrations and more particularly to wavefront sensors for determining the optical path or phase errors present on an input beam.

2. Description of Related Art

Wavefront slope sensors are used, for example, in adaptive optical systems to determine the adjustments necessary to compensate for wavefront distortions produced by the optical train and/or the intervening medium. In most applications, the ideal is a zero wavefront slope over the entire cross section of the beam. A non zero slope indicates distortion and dispersion of the beam, the result being a diminished power delivery or degraded image producing capability.

An outgoing beam can be pre-distorted for example, by varying the pressure applied across the deformable primary mirror as a function of the measured distribution. In this way, an appropriate slope related parameter can be minimized to enhance either the power delivered or the quality of the imagery received.

The criteria according to which wavefront slopes sensors are evaluated include reliability, speed, resolution, and cost. Another primary consideration is the flexibility for use in both pulsed and continuous wave modes.

Several of the available or described slopes sensors include moving elements. The movement may be used to sample different parts of the beam, or to provide multiple measurements of a single part of the beam as necessary to compute the slope. Such systems are disadvantageous in that they are generally limited to continuous wave applications. Also the time involved in the mechanical movement limits the measurement speed of the system. This is particularly problematic where real time adjustments are required. Furthermore, the incorporation of moving parts reduces the reliability and increases the cost of the system.

There is another class of wavefront slope sensors which use multiple subapertures in sampling the wavefront. For example, some Hartman-type sensors use a grating which defines multiple subapertures. The average slope within each subaperture is determined, and the collective determination provides a slope distribution beam.

A major problem with the grating sensor is a difficulty of manufacturing high resolution gratings. Additionally, a significant percentage of the incident light can be lost by reflection or scattering at the grating. Also, diffraction affects become more severe at smaller apertures. Finally, it turns out that the mechanical aperture sensors have greater computational requirements by about a factor of three to four. Thus, real time performance is impaired. The above disclosed available sensors have provided a choice between the limitation of the systems with mechanical movement and those with mechanical grids or subapertures. Thus, there is a need for a reliable, cost effective, fast wavefront sensing which efficiently processes data, provides for high resolution sensing, and is applicable to pulse as well as continuous wave applications.

SUMMARY OF THE INVENTION

Accordingly, the present invention overcomes the disadvantages of the above art. The present invention provides the art with a wavefront sensor utilizing a single detector array and an image orientation device for producing the required image components. The present invention utilizes various prism assemblies for orientating, splitting, and filtering the beams for producing the required image components. Also, the present invention provides imaging function optics and optical adjustments in a compact unit. The present invention further enables an electronic processor to be associated with the wavefront sensor for determining phase errors present on the input beam.

The present invention provides the art with an improved wavefront sensor. The wavefront sensor of the present invention includes mechanisms for obtaining an input beam sample. The beam sample is then directed towards a mechanism for splitting the sample beam into two component beams. A second splitting mechanism converts the two component beams into four component beams. The four component beams, are directed to a mechanism for detecting the intensity distribution of the four component beams. The electronic processor means, associated with the detector mechanism, determines the phase errors present in the input beam from the intensity distribution information.

Generally, the mechanism for splitting the input beam into two component beams is comprised of a prism having a beam splitting element of constant spatial function. The beam splitting element reflects approximately half of the beam's energy intensity through one part of the prism and transmits approximately half of the beam's energy intensity through the other part of the prism. The second mechanism for splitting the two component beams into four component beams is generally comprised of a prism having a beamsplitter of linearly varying ramp transmission function located at an image plane. The ramp beamsplitter reflects some of the beam's energy intensity, approximately one half of the beam's energy intensity, through one part of the prism and transmits some of the beam's energy intensity, approximately one half of the beam's energy intensity, through the other part of the prism. Generally, the two and four beam components which are projected from the prisms are spatially separated at a predetermined distance from one another.

Also disclosed is a method of determining a phase error or aberration of the input beam. The method includes providing an input beam. Projecting the input beam into a mechanism for uniformly splitting the beam into two beam components by means of a constant spatial function beamsplitter. Projecting the two beam components into a mechanism for splitting the two beam components into four beam components by means of the linear ramp function beamsplitter. Projecting the four beam components into a mechanism for detecting the intensity distribution of the four beam components. Determining the phase error of the input beam from the intensity distribution of the four beam components.

The method also includes means for orientating the input beam, the two beam components, and the four beam components as the beam and beam components pass through the respective mechanism for generating the respective components. Additionally, a reference source and a path for the reference beam through the system is provided for purposes of alignment and detector, responsivity and drift, calibration.

From the following description and claims taken in conjunction with the accompanying drawings, other objects and advantages of the present invention will become apparent to one skilled in the art.

BRIEF DESCRIPTION OF THE DRAWINGS

In the accompanying drawings:

FIG. 1 is a side view of an optical ray tracing schematic in accordance with the present invention.

FIG. 2 is a blown up perspective view of the wavefront sensor of FIG. 1.

DETAILED DESCRIPTION OF THE PREFERRED EMBODIMENT

Referring to the Figures, a wavefront sensor is shown and designated with reference numeral (10). Generally, an entrance pupil (12), at which location can be located a steering mirror and having a diameter of approximately 1 cm, introduces an input beam (16) and directs the beam (16) through a two element telephoto interface (14) which, in turn, directs the input beam (16), having a desired f number; preferably f/120, to the wavefront sensor (10). The wavefront sensor (10) includes a mechanism (18) for splitting the input beam (16) into two beam components. A mechanism (20) for receiving the two beam components is positioned adjacent to the mechanism (18). The mechanism (20), splits the two beam components into four beam components. The four beam components (58), (60), (62), and (64) are directed toward mechanism (22) for adjusting and centering the beam components and diverging the beams and reimaging the aforementioned entrance pupil (12). The four beam components (58), (60), (62), and (64) are passed through a mechanism (24) for intensifying the image of the four beam components. A mechanism (26) for detecting the intensity distribution of the four beam components is positioned adjacent to the intensifying mechanism (24). The detecting mechanism (26) is associated with an electronic processor (not shown) for determining the phase error of the input beams.

Now turning to FIG. 2, a blown up view of the wavefront sensor (10), a better understanding of the wavefront sensor (10) may be obtained. Generally, the input beam (16) is passed through a boresight adjustment mechanism (28) for properly orientating, tilting, laterally shifting, and aligning the input beam (16) which in turn, is projected into the splitting mechanism (18). The boresight adjustment mechanism (28) functions so as to place the input beam into proper orientation. Generally, the boresight adjustment mechanism (28) may include a paralax plate, a focusing lens or the source may be translated in a plane with the incoming beam. A lens (34) may also be positioned in the line of projection of the input beam (16) for enabling the correct location of the image of the entrance pupil (12) later in the system.

A reference beam (30) is periodically projected through the system. The reference beam (30) enables periodic checks of the alignment of the system along with detector, responsivity and drift, calibration. The reference beam (30) may pass through a boresight adjustment mechanism (32). The reference beam (30) passes through the system in a fashion analogous to the input beam, as will be described herein.

The splitting mechanism (18) is generally comprised of a prism. The prism includes a beamsplitter plane (38) for transmitting and reflecting the input beam (16) through the prism. The beam splitter (38) generally enables approximately 50% of the beam energy intensity to be transmitted through the beamsplitter (38) and enables approximately 50% of the beam energy intensity to be reflected off of the beamplitter (38).

Generally, the prism (18) and beamsplitter (38) functions as follows: the input beam (16) enters one face (40) of the prism and is projected towards the beamsplitter (38). As the projected input beam (16) encounters the beamsplitter (38) approximately 50% of the input beam (16) energy is transmitted through the beamsplitter (38) to a second face (42) of the prism (18). The input beam (16) is reflected from face (42) through and out of the prism (18). Approximately 50% of the input beam (16) energy encounters the beamsplitter (38) and is reflected by the beamsplitter (38) to a third face (44) of the prism (18). The input beam is reflected from face (44) through and out of the prism (18). Generally, the prism (18) is a pentafold prism for beams reflected at beamsplitter (38) and a single reflection prism for beams passing through the beamsplitter (38). The two components (46) and (48), thus formed, project form the prism (18) at a predetermined spatial distance with respect to one another. The chosen distance is such that once the component (46) and (48) have proper spacing, they enter into the second splitting mechanism (20).

The two component beams (46) and (48) are projected from the splitting mechanism (18) towards the splitting mechanism (20). The splitting mechanism (20) is a second prism containing a linear ramp beamsplitter located at a focal plane (52) within the prism (20). The two beam components (46) and (48) are projected through a first prism face (51) onto the focal plane (52) where the component beams (46) and (48) are again split. The focal plane (52) has a pair of linear ramp beamsplitters (53) and (55) which enable the component beams (46) and (48) to be transmitted and reflected through the prism (20). The linear ramp beamsplitters (53) and (55) have a predetermined orientation and shape for properly transmitting and reflecting the two component beams (46) and (48) through the prism (20). Prism (20) is a pentafold prism for the two beams first reflected at (55) and then reflected from surface (56) while prism (20) serves as a single fold prism for the two beams passing through (55) and reflected from surface (54). Generally, the linear ramp beamsplitters (53) and (55) enable some of the beam energy to pass through the focal plane (52) and reflect the rest of the energy from the focal plane (52). Preferably, 50% of the beam energy intensity is transmitted directly through the focal plane (52) to a second face (54) of the prism (20). The beam is reflected from the second face (54) through and out of the prism (20). Fifty percent of the beam energy intensity is reflected from the focal plane (52) to a third face (56) of the prism (20). The beam is reflected from the third face (56) through and out of the prism. Thus, the two component beams (46) and (48) are direct to linear ramp beamsplitters (53) and (55) split, as explained above, to form four component beams (58), (60), (62), and (64). The four component beams are positioned at a predetermined desired distance from one another such that when the beams are projected to the detector mechanism (26) the intensity distribution of the beams can be determined. the prism (20), along with splitting the beams, reorientates the beams as will be described herein.

The four beam components (58), (60), (62), and (64) are projected towards the adjusting centering, and diverging mechanism (22). The adjusting, centering, and diverging mechanism (22) is comprised of a plurality of four lenses (66), (68), (70), and (72) each which centers, adjusts, and diverges one of the four component beams (58), (60), (62), and (64), respectively, so that the four component beams are properly centered and an image of the entrance pupil (12) is projected onto the detector mechanism (26).

After the four component beams (58), (60), (62), and (64) are projected through the adjusting, centering and diverging mechanism (22) they are focused on exit pupils (74), (76), (78) and (80), respectively, of the intensifying mechanism (24). The intensifying mechanism (24) is generally an image intensifier having a geometrical image magnification of 1×. The image intensifier greatly magnifies the intensity of the four component beams (58), (60), (62), and (64) so that the intensity distribution of the beams can easily be interpreted by the detector mechanism (26).

After the four component beams (58), (60), (62), and (64) have passed through the image intensifier (24) the beams are directed with minimal gap onto a detector mechanism (26); perferably the detector mechanism (26) is cemented to the image intensifier (24) by conventional means. The detector mechanism (26) is a single detector array chip for interpreting intensity distribution of the four component beams. The detector array chip generally includes four subapertures (82), (84), (86), and (88) having a specific orientation pattern on each of the subapertures for interpreting the intensity distribution of the four component beams.

As can be seen in FIG. 2, and for explanation purposes only, the subapertures (82), (84), (86), and (88) have been marked with identifying indicia; $X_1$, $X_2$, $Y_1$ and $Y_2$. Each subaperture includes a pair of characters (90) and (92). Character (90) includes a circle portion (94) and a line portion (96). Character (92) includes an arrow portion (98) and a line portion (100). The various positioning of the characters (90) and (92) explains how the reading of the intensity distribution of the four component beams is taken. The reading of component beams is as follows. The beams are read from the circle portion (94) through the line portion (96) and progressively sampled in the direction of the arrow point from the end of the line portion (100) through the arrow portion (98) of the subaperture.

For example, the intensity distribution projected onto subaperture (88) of $X_1$ would be read from circular portion (94), on the right hand side of the subaperture, to the end of the line portion (96), or towards the left and the intensity would be progressively sampled in the direction of the arrow (98), from the end of the line (100) to the point of the arrow (98), which is from the bottom to the top of the subaperture (88). The intensity distribution of the remaining subaperture would be read in the same way; reading from the circular portion (94) to the end of the line (96) and progressively sampling the beam in the direction of the arrow, from the end of the line (100) to the point of the arrow (98). In doing so, the detector array (26) reads the intensity distribution of a point on the input beam simultaneously with respect to the corresponding point on the input beam at the same time along each of the subapertures of the detector (26). For example, if the reading at one subaperture is at the circular portion (94) of the subaperture than the remaining three subapertures would be interpreting the intensity distribution of their respective beam components at the circular portion (94) on their subaperture.

The component beams would then be read through the line (96) and progressively sampled in the direction of the arrow (98), from the end of the line (100) to the point of the arrow (98), such that the simultaneous reading of the beam along the character (90) would be at the same place along all the characters (90) at the same time at each of the four subapertures.

The signals from the detector array (26) are then converted by an electronic processor which calculates and determines the phase error of the input beam (16) from the information obtained from the intensity distribution on the detector array (26).

Obviously, different array configurations can be employed. Other embodiments utilize sensors with much greater resolution, the trade-off appearing in the amount of data to be processed in characterizing the laser beam. However, the additional processing is in proportion to the number of detectors or subapertures defined. The reading from each intensity sensor is converted to binary form by an analog-to-digital converter (not shown) as required by the processor.

The processor performs the pointwise differencing, and division by sums to normalize. A scaling factor of 0.5 is applied under theoretical considerations in the illustrated system. More generally, the calculation is of the form:

$$s(x) = K [I_t(x) - I_r(x)] [I_t(x) + I_r Y(x)]^{-1}$$

where s(x) is the slope at points $X_1$, $X_2$, $Y_1$, and $Y_2$, $I_t(x)$ is the intensity of the transmitted component at the point corresponding to $X_1$, $X_2$, $Y_1$, and $Y_2$, on the associated intensity sensor, $I_r(x)$ is the intensity of the reflected component at the point corresponding to points $X_1$, $X_2$, $Y_1$, and $Y_2$, on the associated intensity sensor, and K is a constant.

K equals one half in the case of a linear ramp filter of infinite spatial diameter. This factor is applicable where the spatial diameter is large relative to the spatial dispersion of the laser beam spot on the ramp filter.

In addition, the processor provides for translations and scalings of the inputs in accordance with calibration determinations. In the context of the illustrated system, 4 additions/subtractions and 3 multiplication/divisions are performed. The differencing, the calculation of the normalizing figure, and two calibration translations are the 4 addition/subtractions. The normalization, multiplication by a theoretical scaling factor and a calibration factor constitute the three multiplications.

For a two-dimensional system, 8 additions and 6 multiplications would be required per subaperture. This figure compares very favorably with other systems capable of evaluating pulsed inputs. These typically required 64 additions and 18 multiplies per subaperture. The present invention also has a significant computational advantage over systems limited to continuous wave measurements.

The wavefront sensor (10) generally functions as follows: The input beam (16) is directed through the adjustment mechanism (28) and lense (34) such that the beam is projected into the splitting mechanism prism (18). The beam (16) is projected into the beamsplitter (38). The beam (16) is split such that approximately 50% of the beam energy intensity of the beam is transmitted directly through the beamsplitter (38) to a face of the prism and then is reflected through the prism. Approximately 50% of the beam energy intensity of the beam is reflected by the beamsplitter (38) to a face of the prism and then reflected through the prism.

The cross shaped character (102) made up of characters (90) and (92), illustrate the orientation of the beam (16) entering the splitting mechanism prism (18). As the beam is projected into and through the splitting mechanism prism (18), the orientation of the beam components (46) and (48), as they exit the prism (18), are designated by cross shaped characters (104) and (106).

The component beams (46) and (48) are projected into the splitting mechanism prism (20). The splitting mechanism prism (20) is generally a linear ramp beamsplitter located at the focal plane (52). As the component beams (46) and (48) are projected onto the focal plane (52) the beams are split into four component beams (58), (60), (62), and (64). Approximately 50% of the energy intensity of the two component beams (46) and (48) is transmitted through the focal plane (52) to a face of the prism and then is reflected through the prism. Approximately 50% of the energy intensity of the two component beams is reflected by the focal plane (52) to a face of the prism and then reflected through the prism.

At this time, the two component beams (46) and (48) have been split such that the four component beams (58), (60), (62), and (64), exiting the prism (20), each contain approximately 25% of the beam energy intensity from the input beam (16). Approximately 50% of the beam energy intensity of the two component beams (46) and (48) has been transmitted through the focal plane (52) and approximately 50% has been reflected from the focal plane (52). Also the splitting prism (20) reorientates the component beams (58), (60), (62), and (64) as shown by the cross shaped characters (108) and (110), (112) and (114). The cross shaped characters (108), (110), (112), and (114), with characters (90) and (92), are in the proper orientation to be read by the detector mechanism (26). Thus, the beam has passed through the beam splitters (18) and (20) and now is in a proper orientation to be read by the detector mechanism (26).

The four component beams (58), (60), (62), and (64) are passed through the lenses (66), (68), (70), and (72) of the adjusting, centering and diverging mechanism (22) where the beams components are focused and centered onto the image intensifier (24). The image intensifier (24) magnifies the intensity of the beam components so that the four component beams can easily be interpreted by the detector mechanism (26). The detector mechanism (26) interprets the intensity distribution of the four component beams (58), (60), (62), and (64) and transmits that information to the electronic processor 120. The processor 120 process the information from the detector mechanism (26) and determines whether or not phase or aberration errors exist on the input beam (16). Generally, this is done by using the slope technique explained above. If a zero slope or error is found then the input beam need not be corrected. If however, a non zero slope or error is found, the processor 120 will send a command to adjust the input beam by means of an adaptive optical element not illustrated here.

The present invention provides the art with a compact hardware apparatus which may be used in determining the phase errors present on an input beam. The present invention may be utilized in systems like that of U.S. Patent Application Ser. No. 793,941, filed Nov. 1, 1985, now U.S. Pat. No. 4,690,555 issued Sept. 1, 1987, entitled "Solid-State Wavefront Slope Determination"; the specification of which is herein incorporated by reference.

In accordance with the foregoing, an improved wavefront sensor for enabling determination of phase difference is presented. As indicated, modifications, variation, and alterations may be made in the present invention without varying from the scope and fair meaning of the subjoined claims.

What is claimed is:

1. A wavefront sensor comprising:
 means for obtaining an input beam sample;
 first means for splitting said beam into two component beams;
 second means for splitting said two component beams into four component beams such that a portion of said beams are reflected by said second means for splitting and a portion of said beams are transmitted through said second means for splitting; and
 means for detecting the intensity distribution of said four component beams.

2. The wavefront sensor according to claim 1 wherein said detector means being a detector array having a predetermined orientation for intercepting said four component beams directed from said second splitting means.

3. The wavefront sensor according to claim 1 wherein a reference beam being associated with said sensor, said reference beam being periodically projected through said sensor for periodically checking alignment of said sensor and for calibrating responsivity and drift of said detector means.

4. The wavefront sensor according to claim 1 wherein said first means for splitting including prism means for reflecting approximately one-half of said beam energy intensity through said prism means and for transmitting approximately one-half of said beam energy intensity through said prism means.

5. The wavefront sensor according to claim 4 wherein said prism means being a pentafold prism for reflected beams and a single reflecting prism for transmitted beams.

6. The wavefront sensor according to claim 4 wherein said second means for splitting including prism means for reflecting approximately one-half of said beam energy intensity through said prism means and for transmitting approximately one-half of said beam energy intensity through said prism means.

7. The wavefront sensor according to claim 1 further comprising means for intensifying said four component beams.

8. An apparatus for determining the phase errors on an input beam comprising:
 means for obtaining an input beam sample;
 first means for splitting said beam into two component beams;
 second means for splitting said two component beams into four component beams;
 means for intensifying said four component beams;
 means for detecting the intensity distribution of said four component beams; and
 means for determining phase errors of said input beam from said intensity distributions.

9. The wavefront sensor according to claim 8 wherein said detector means being a detector array having a predetermined orientation for intercepting said four component beams directed from said second splitting means.

10. The wavefront sensor according to claim 8 wherein said first means for splitting including prism means for reflecting approximately one-half of said beam energy intensity through said prism means and for transmitting approximately one-half of said beam energy intensity through said prism means.

11. The wavefront sensor according to claim 10 wherein said second means for splitting including prism means for reflecting approximately one-half of said beam energy intensity through said prism means and for transmitting approximately one-half of said beam energy intensity through said prism means.

12. A method of determining a phase error of an input beam, comprising:
    providing an input beam;
    projecting said beam into a first means for splitting said beam into two component beams;
    projecting said two component beams into a second means for splitting said two component beams into four component beams;
    intensifying said four component beams;
    projecting said four component beams into a means for detecting the intensity distribution of said four component beams; and
    determining the phase error of said input beam from said intensity distribution.

13. The method according to claim 12 further comprising;
    orientating said input beam prior to projection into said first splitting means.

14. The method according to claim 13 further comprising orientating and spacing said two component beams projecting from said first splitting means.

15. The method according to claim 14 further comprising reorientating and spacing said four component beams projecting from said second splitting means.

16. The method according to claim 15 further comprising focusing and centering said four component beams projecting from said second splitting means.

* * * * *